(12) United States Patent
Bowen

(10) Patent No.: US 11,459,016 B2
(45) Date of Patent: Oct. 4, 2022

(54) MANUAL STEERING CONTROL UNIT FOR AUTONOMOUS VEHICLE

(71) Applicant: BENTLEY MOTORS LIMITED, Crewe (GB)

(72) Inventor: George Channing Bowen, Crewe (GB)

(73) Assignee: Bentley Motors Limited, Crew (GB)

( * ) Notice: Subject to any disclaimer, the term of this patent is extended or adjusted under 35 U.S.C. 154(b) by 0 days.

(21) Appl. No.: 17/291,909

(22) PCT Filed: Oct. 9, 2019

(86) PCT No.: PCT/GB2019/052864
§ 371 (c)(1),
(2) Date: May 6, 2021

(87) PCT Pub. No.: WO2020/095020
PCT Pub. Date: May 14, 2020

(65) Prior Publication Data
US 2022/0009541 A1    Jan. 13, 2022

(30) Foreign Application Priority Data

Nov. 8, 2018    (GB) ..................................... 1818230

(51) Int. Cl.
*B62D 1/183*    (2006.01)
*B62D 1/12*    (2006.01)
*B62D 1/22*    (2006.01)

(52) U.S. Cl.
CPC .............. *B62D 1/183* (2013.01); *B62D 1/12* (2013.01); *B62D 1/22* (2013.01)

(58) Field of Classification Search
CPC . B62D 1/183; B62D 1/12; B62D 1/22; B62D 1/02; B62D 1/18
See application file for complete search history.

(56) References Cited

U.S. PATENT DOCUMENTS 2,822,214 A * 2/1958 Rivolta ..................... B62D 1/18
280/775
4,299,407 A * 11/1981 Simson ..................... B62D 1/18
280/775

(Continued)

FOREIGN PATENT DOCUMENTS

DE        10347925 A1    5/2005
GB        2308642 A      7/1997

(Continued)

OTHER PUBLICATIONS

GB Patent Application No. 1818230-3; Combined Search and Examination Report; dated Apr. 9, 2019.

(Continued)

*Primary Examiner* — Frank B Vanaman
(74) *Attorney, Agent, or Firm* — Schwabe Williamson & Wyatt, P.C.

(57) ABSTRACT

A vehicle (12) operable in manual and autonomous modes has a manual steering control unit (10) movable between a stowed position and an operative position. Movement of the steering control unit (10) as it transitions between stowed and operative positions comprises at least a component in a lateral direction of the vehicle so that when not in use, it is located laterally outside the free interior volume of the vehicle cabin (14) in the stowed position. The manual steering control unit (10) can be received within a recess (18) in a side wall region (16) of the vehicle cabin or in a central console in the stowed position.

20 Claims, 7 Drawing Sheets

(56) References Cited

U.S. PATENT DOCUMENTS

| | | | | |
|---|---|---|---|---|
| 5,845,735 | A * | 12/1998 | Muller | B60K 26/02 |
| | | | | 180/323 |
| 7,147,080 | B2 * | 12/2006 | Higashi | B62D 1/00 |
| | | | | 180/315 |
| 2003/0183438 | A1 * | 10/2003 | Higashi | B62D 1/12 |
| | | | | 180/315 |
| 2004/0016588 | A1 | 1/2004 | Vitale | |
| 2005/0283288 | A1 | 12/2005 | Howell | |
| 2011/0272930 | A1 * | 11/2011 | Lisseman | B62D 5/001 |
| | | | | 74/492 |
| 2016/0121917 | A1 * | 5/2016 | Bonfante, Jr. | B62D 1/046 |
| | | | | 74/473.2 |
| 2018/0079441 | A1 * | 3/2018 | McKinzie | B62D 1/181 |
| 2019/0077263 | A1 * | 3/2019 | Pegorier | B60K 37/02 |
| 2019/0367072 | A1 | 12/2019 | Hansen | |

FOREIGN PATENT DOCUMENTS

| | | | |
|---|---|---|---|
| GB | 2550610 | A | 11/2017 |
| GB | 2550640 | A | 11/2017 |
| GB | 2550641 | A | 11/2017 |
| WO | 2017067721 | A1 | 4/2017 |

OTHER PUBLICATIONS

PCT Patent Application No. WO2020095020, International Search Report; dated Jan. 15, 2020.

* cited by examiner

MANUAL STEERING CONTROL UNIT FOR AUTONOMOUS VEHICLE

CROSS-REFERENCE TO RELATED APPLICATION

This application is a 371 U.S. National Stage of International Application No. PCT/GB2019/052864, filed Oct. 9, 2019, entitled "MANUAL STEERING CONTROL UNIT FOR AUTONOMOUS VEHICLE," which designated, among the various States, the United States of America, and which claims priority to GB1818230.3, filed Nov. 8, 2018, both of which are hereby incorporated by reference in their entireties.

TECHNICAL FIELD OF THE INVENTION

The present invention relates to control systems for an autonomous vehicle. The invention relates in particular to an autonomous vehicle having a manual steering control unit which can be moved between operative and stowed positions.

BACKGROUND TO THE INVENTION

Autonomous road vehicles are being developed which can be controlled largely automatically with minimal input from a driver. However, until full autonomy can be achieved, it remains a requirement for autonomous vehicles to incorporate manual controls that can be used when autonomous control is not available or not desirable.

One advantage of an autonomous vehicle is that when operated in an autonomous mode, it is not essential to accommodate a driver sitting in a conventional driving position. This allows for greater freedom in configuring the interior cabin to make the best possible use of the available space and to provide alternative seating arrangements to those found in a conventional motor vehicle. However, where a vehicle is to be switched between autonomous and manual modes of operation, it is preferable to provide manual controls which are similar to those used in conventional motor vehicles and with which drivers are already familiar. Typically this will include a steering wheel at the front of the cabin, usually to one side of the vehicle, and which can be operated by a driver siting in a conventional driving position. However, the provision of a steering wheel in the conventional position takes up a significant amount of room in the cabin and inhibits reconfiguration the cabin when the vehicle is being operated in an autonomous mode.

FR 2 861 657 A1 discloses one attempt to address this issue by providing a retractable steering wheel assembly which can be stored under the dashboard when not in use. This arrangement allows the steering wheel to be moved in longitudinal direction of the vehicle between a stowed position in which it is contained within the dashboard and an operative position in which it extends from the dashboard into the cabin space and is accessible to a driver.

Whilst the retractable steering wheel arrangement in FR 2 861 657 A1 frees up space in the cabin when the vehicle is being operated in an autonomous mode, it has limitations in terms of the overall configuration of the cabin interior. The dashboard must extend longitudinally into the interior of the cabin space sufficiently in order to accommodate the steering wheel when stowed and the steering wheel projects longitudinally beyond the dashboard into the cabin space when in its operative position. As a result, a considerable volume in the front of the vehicle cabin has to be allocated to accommodating the steering wheel in both its stowed and operative positions.

It is desirable, therefor, to provide alternative manual control arrangements for an autonomous vehicle which are more flexible than the known arrangements.

In particular, it is desirable to provide an alternative manual steering control unit for an autonomous vehicle which can be moved between operative and stowed positions but which offers greater flexibility in overall cabin configuration and an autonomous vehicle having such a manual steering control unit.

SUMMARY OF THE INVENTION

According to a first aspect of the invention, there is provided a vehicle operable in manual and autonomous modes, the vehicle having a passenger cabin and a manual steering control unit for use when the automobile is operated in the manual mode, the manual steering control unit being movable between a stowed position and an operative position, wherein movement of the manual steering control unit between the stowed and operative positions comprises at least a component in a lateral direction of the vehicle.

The movement of the manual steering control unit between the stowed and operative positions may be substantially exclusively in a lateral direction of the vehicle or it may comprise components in both lateral and longitudinal directions of the vehicle.

The movement of the manual steering control unit may comprise a lateral component over substantially the whole of its range of movement between the stowed and operative positions.

The manual steering control unit may be located laterally to one side of a free interior volume of the vehicle cabin in the stowed position. The manual steering control unit may be located within a side wall region of the vehicle cabin in the stowed position and may be received within a recess in the side wall region. The recess may be at least partly defined within a door of the vehicle. Alternatively, the manual steering control unit may be located laterally in a central region of the cabin when in the stowed position. In which case, the manual steering control unit may be located within a centre console or other interior trim portion which is located centrally within the vehicle cabin in the stowed position. In this embodiment, the manual steering control unit may be selectively movable from the central stowed position to either one of a first and a second operative position, the first and second operative positions being located on opposite sides of the central stowed position. This allows for right or left hand drive of the vehicle.

The manual steering control unit may comprise a manual steering control input device rotatably mounted to a base, the base being mounted to a supporting structure for movement between said stowed and operative positions. The base may be mounted to an arm pivotally attached to a supporting structure. The supporting arm may be attached to the supporting structure for movement in a longitudinal direction of the vehicle. In an embodiment, the support arm comprises a pair of parallel links, first ends of the links being pivotally and slidably mounted to the supporting structure, second ends of the links being pivotally connected to the base. The links may form part of a parallelogram type four bar linkage together with the supporting structure and the base.

The vehicle may be configured such that in use the manual steering control unit is maintained in a constant orientation during movement between stowed and operative positions.

The manual steering control unit may comprise a manual steering control input device rotatably supported on a base, the manual steering control input device having a central hub and a pair of hand grips attached to the central hub by arms. The hand grips may be mounted to the central hub for movement between a storage configuration in which the grips are at least partially contained within the central hub and an operative configuration in which the grips are located outside the central hub on opposite sides. The arms may each be connected to the hub for movement between a retracted position in which the arm is contained within the hub and an extended position in which an end of the arm projects laterally from the hub. Each grip may be pivotally mounted to said end of its respective arm for movement between a retracted position in which a longitudinal axis of the grip is aligned co-planer with the arm and an extended position in which the longitudinal axis of the grip is angled relative to the plane of the arm.

The manual steering control unit may comprise user operable input devices for controlling acceleration and braking of the vehicle. The user operable input devices may include a trigger input controller mounted to each grip.

DETAILED DESCRIPTION OF THE INVENTION

In order that the invention may be more clearly understood an embodiment thereof will now be described, by way of example only, with reference to the accompanying drawings, of which:

The accompanying drawings illustrate schematically an embodiment of a manual steering control unit 10 for use in an autonomous or semi-autonomous vehicle 12, which vehicle is operable in both manual and autonomous modes of use. The vehicle 12 is typically a motor vehicle, such as a motor car or automobile, which can be driven on conventional roads. When operated in autonomous mode, it is expected that the vehicle will be largely self-driven, requiring no input from a driver to steer the vehicle or to control acceleration and braking. In the manual mode, driver input will be required to steer the vehicle and may also be required to control acceleration and braking, at least to some extent.

Directional terms such as "front" and "forward", "rear" and "rearward" and the like as applied herein refer to the position and/or orientation of the item described relative to the orientation of the vehicle. Thus, the "front end" of an item will be that end closest to the front of the vehicle and the "rear end" that end closest the rear of the vehicle. Terms such as "longitudinal" and "longitudinally" and the like as used herein refer to a direction of the vehicle from front to back, whilst terms such as "lateral" and "laterally" and the like refer to a direction from side to side of the vehicle.

The vehicle 12 has a cabin 14 having an interior volume within which passengers are accommodated. Parts of the interior volume may be occupied by fixed interior trim components such as a dashboard or central console or the like. The remainder of the interior volume will be referred to as the "free interior volume" which is generally available to accommodate passengers.

Figure 1:
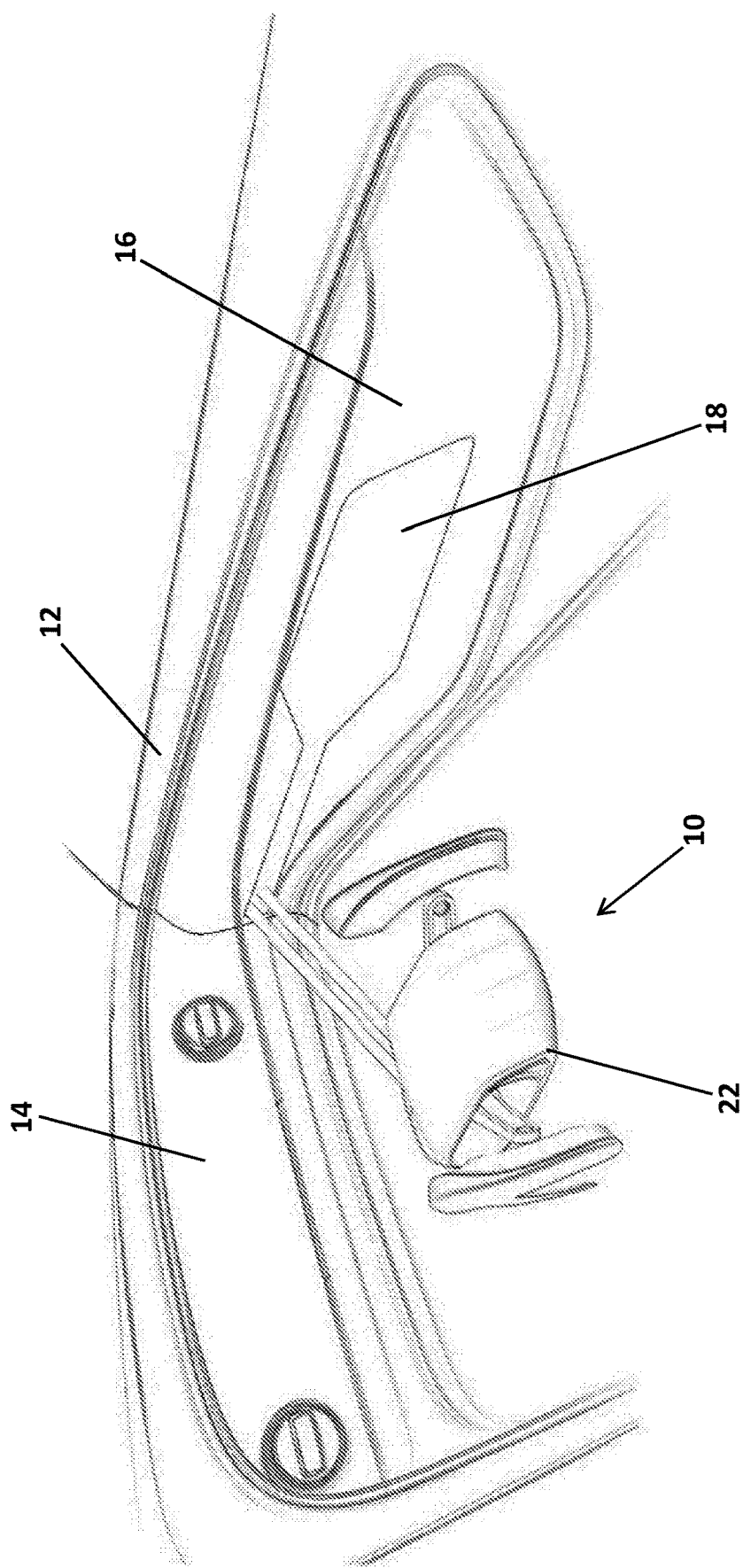
FIG. 1 is a schematic perspective view of part of the interior of a cabin of a motor vehicle in accordance with an aspect of the invention showing a manual steering control unit in an extended position.
Figure 2:
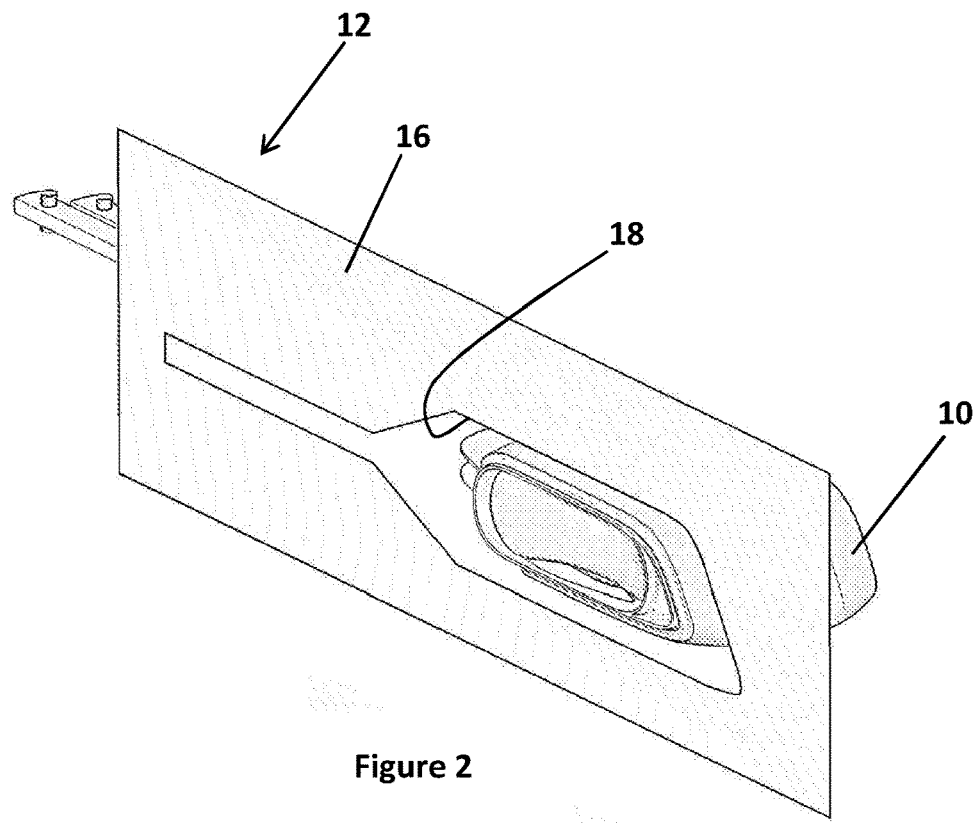
FIGS. 2 and 3 are schematic perspective view of part of the interior of a cabin of a motor vehicle illustrated in FIG. 1 showing a side wall region of the cabin and a manual steering control unit in a stowed position and an extended position respectively.
Figure 3:
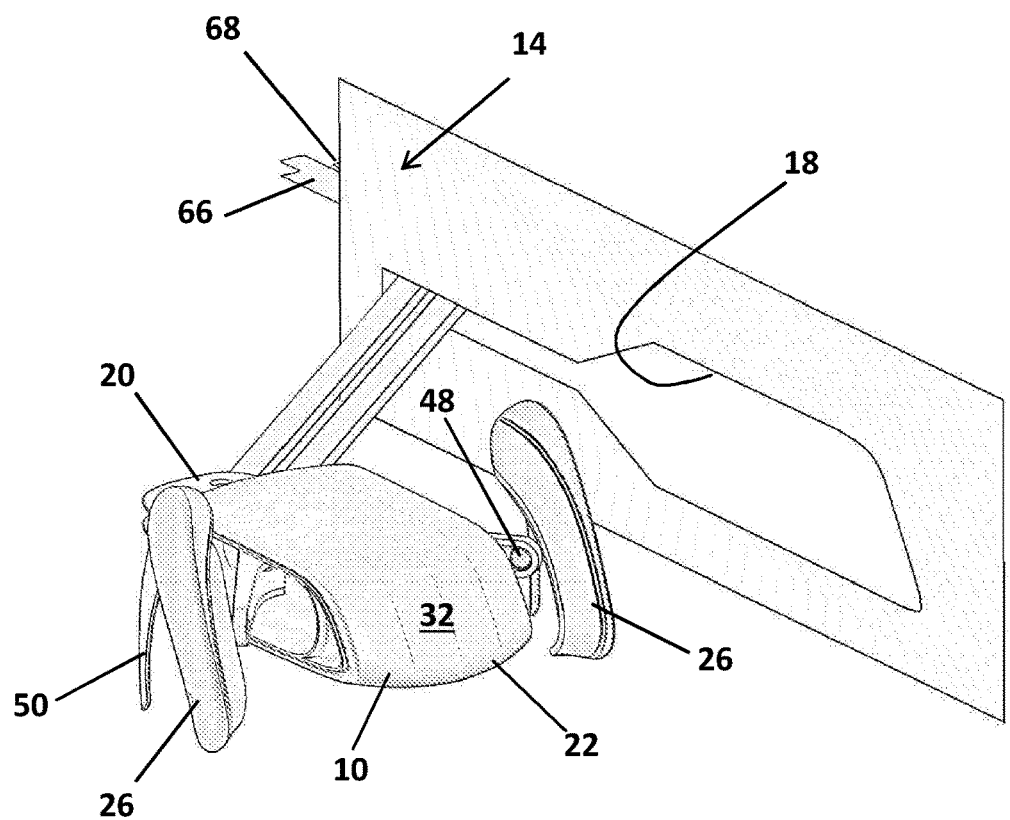
Figure 4:
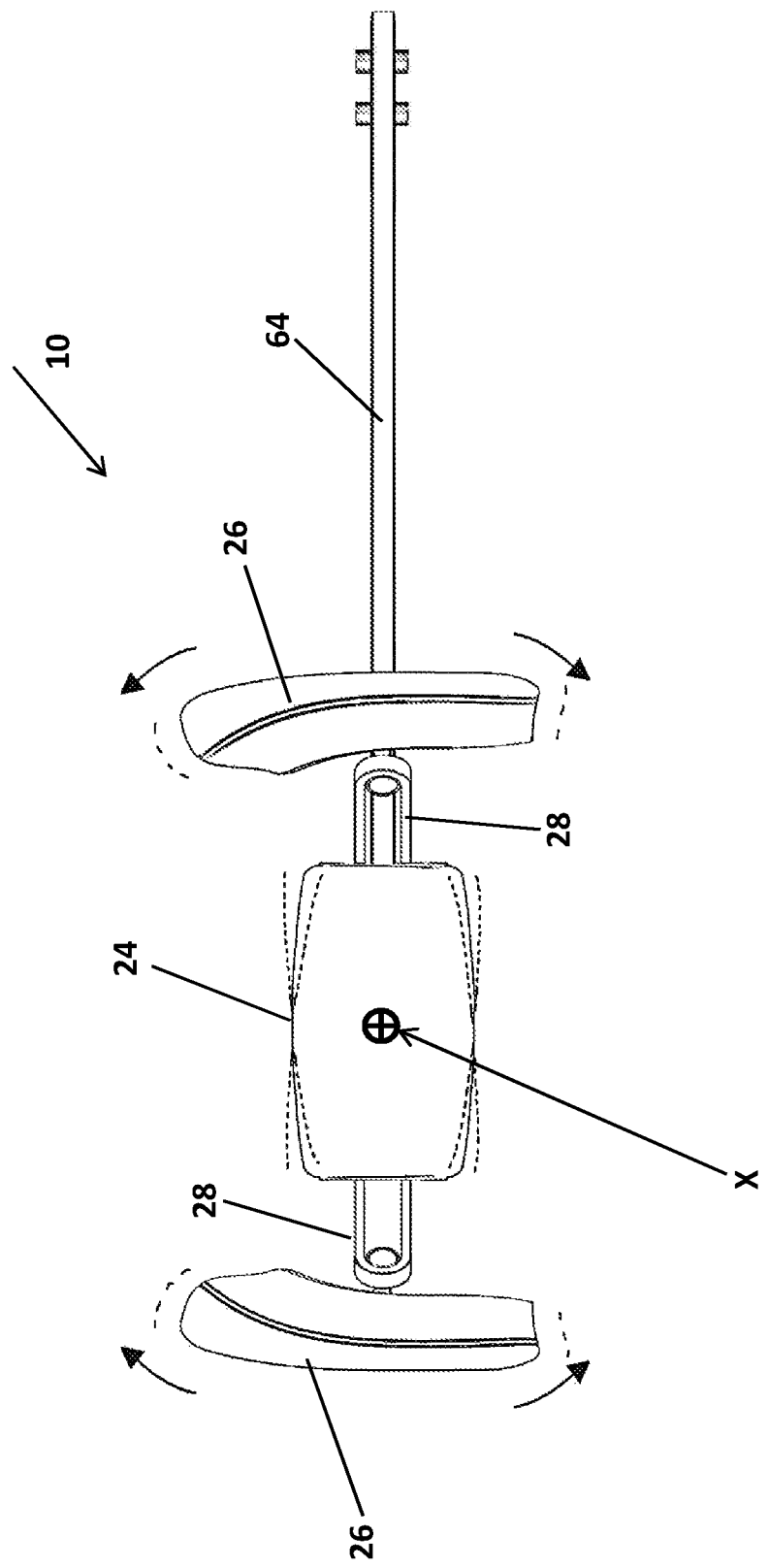
FIG. 4 is view from the rear of the manual steering control unit in FIGS. 1 to 3 in its operative configuration.
Figure 5:
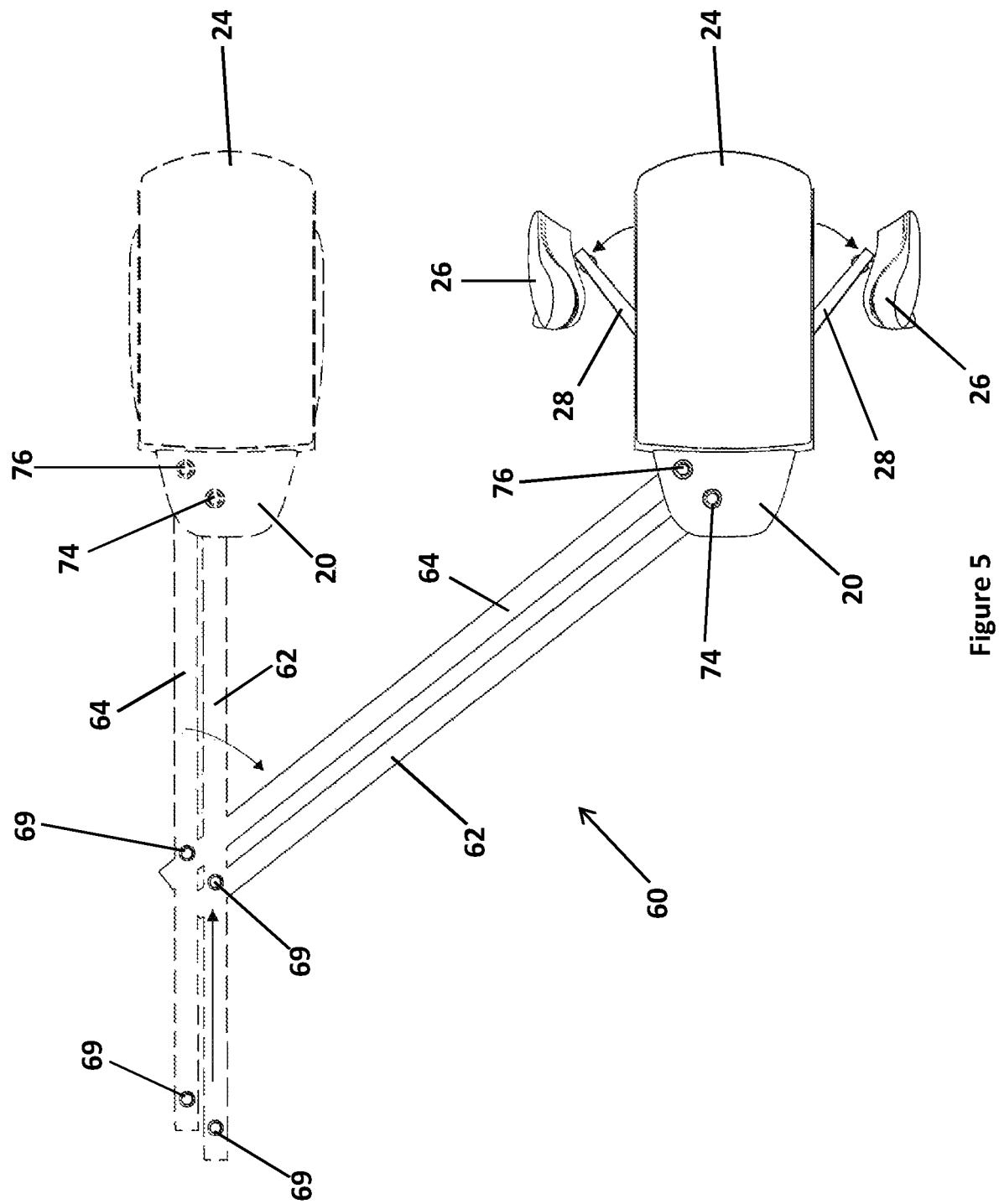
FIG. 5 is a composite image from above of the manual steering unit in FIGS. 1 to 4, showing the unit in its stowed position and configuration in broken lines and in its operative position and configuration in solid lines.
Figure 6:
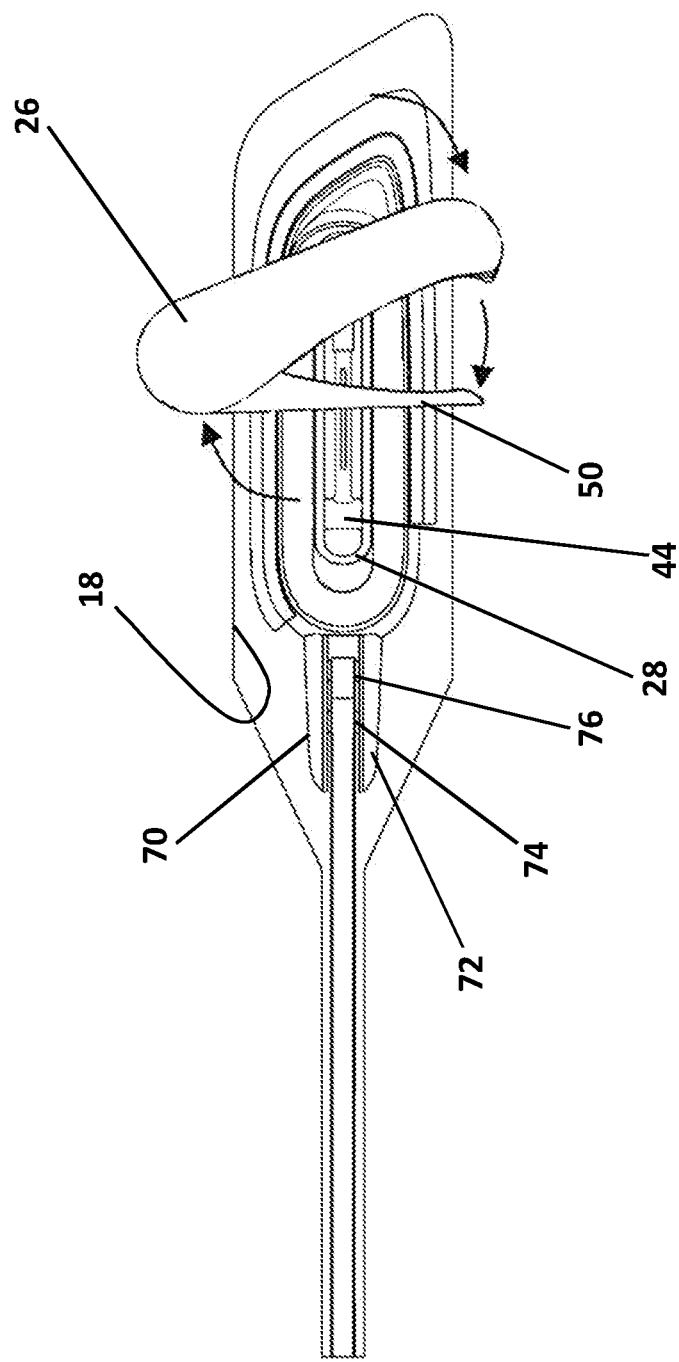
FIG. 6 is a view from the side of the manual steering unit in FIGS. 1 to 5, showing the unit in its operative configuration.
Figure 7:
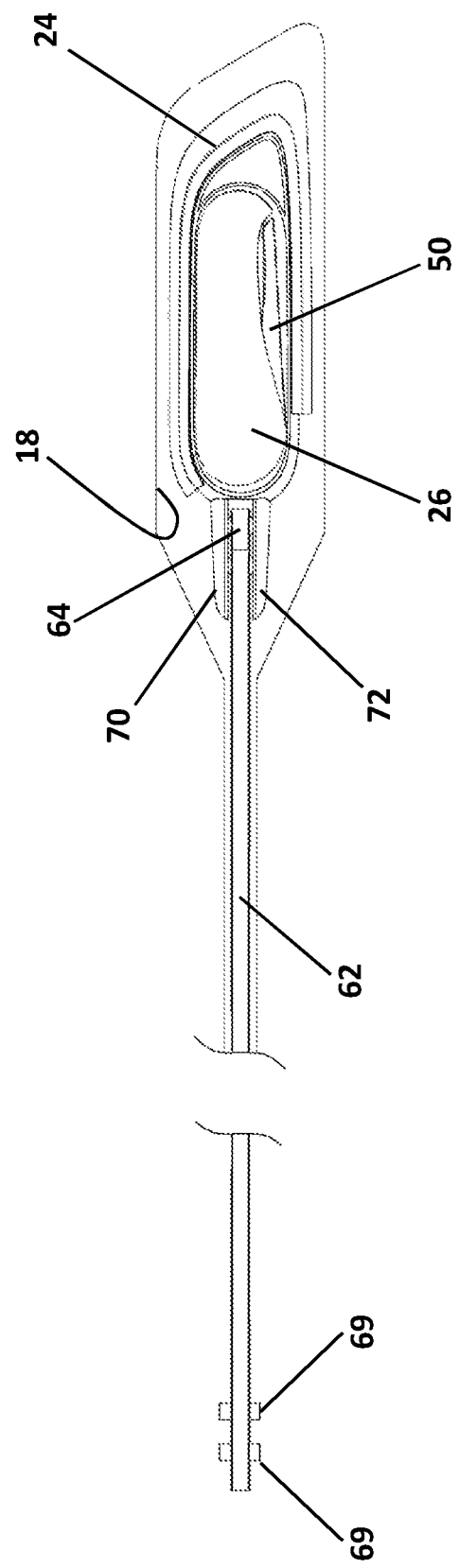
FIG. 7 is a view similar to that of FIG. 6 but showing the manual steering unit in its stowed configuration.
Figure 8:
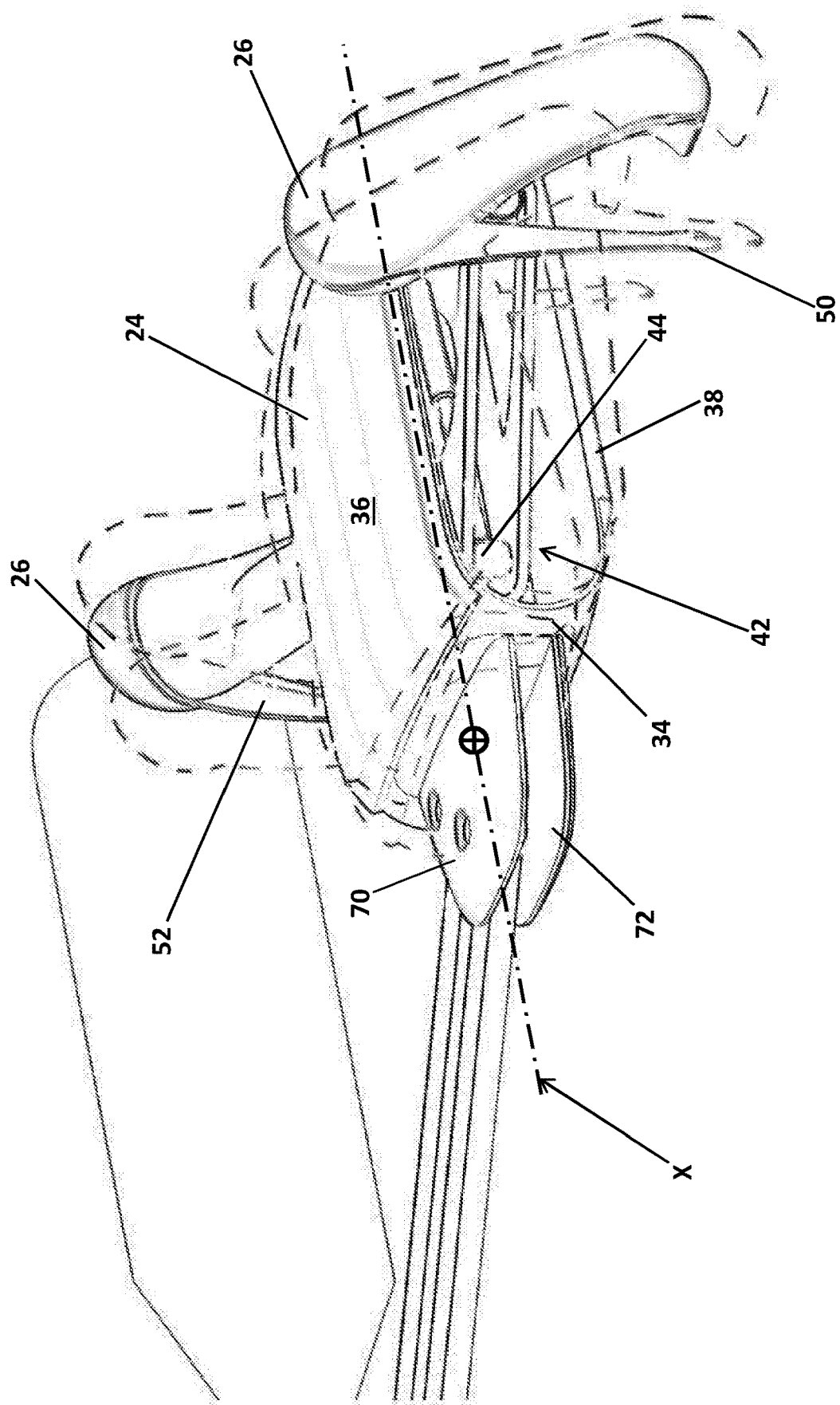
FIG. 8 is a further perspective view from the front and to one side of the manual steering unit in FIGS. 1 to 7, showing the unit in its operative configuration.

In FIGS. 1 to 3, the inner surface of a side wall region of a body of the vehicle which partly defines the free interior volume of a vehicle cabin is illustrated semantically at 16. The side wall region 16 may include one or more doors for accessing the vehicle cabin.

The manual steering control unit 10 is movable in a lateral direction of the vehicle as it transitions between an operative position as illustrated in FIGS. 1 and 3 and a stowed position as illustrated in FIG. 2. In the operative position, the manual steering control unit 10 is suitably located within the free interior volume of the cabin at a position where it can be accessed by a driver. Typically, the driver will be sat in a driving seat (not shown), which may be located towards the front of the cabin to one side or the other. However, a central driving position is also contemplated.

When stowed, the manual steering control unit 10 is moved laterally to one side of the cabin and is received in a recess 18 in the side wall region 16 of the vehicle body, which is outside the free internal volume of the cabin. The recess 18 might be defined within a door of the vehicle, for example In an alternative embodiment, the manual steering control unit 10 is moved laterally to a central position within the vehicle cabin when stowed. The term "central position" refers to a position which is located substantially centrally in a lateral direction of the vehicle cabin but which may not be central in a longitudinal direction. In this case, the manual steering control unit 10 can be accommodated within a centre console or the like which is outside of the free internal volume of the cabin. An advantage of a central stowed position is that the manual steering control unit 10 could be configured so that it can be moved to operative positions on either side to selectively allow for left or right hand drive of the vehicle.

The manual steering control unit 10 comprises a base 20 and a manual steering input device 22 rotatably mounted the base. The manual steering input device 22 can be considered a "steering wheel", which term is used herein to refer generally to any suitable steering input device rotatable about a central axis X and which has portions that can be gripped by a user's hands spaced from the central axis to control rotation of the device about the axis X. The hand grip portions may be provided as part of a continuous circular hand grip as in a conventional steering wheel. However, the term steering wheel is also intended to cover rotatable steering input devices in which hand grip portions are not part of a continuous circular hand grip and which may be provided as discreet gripping members, for example. In the embodiment illustrated, the steering wheel 22 has a central hub 24 and a pair of hand grips 26 connected to the hub and which are grasped by a user to control rotation of the hub about a central axis to steer the vehicle.

The manual steering control unit 10 is configured for drive-by-wire control of the vehicle. Any suitable drive-by-wire systems as are known in the art or which may be developed can be adopted. Since details of the drive-by-wire systems are outside the scope of this patent application they will not be described in in detail. However, briefly the drive-by-wire control will typically comprise a number of input devices on the manual steering control unit 10 which provide control signals to an Electronic Control Unit (ECU) (not shown) which effects control of the steered wheels and other functions of the vehicle by means of suitable actuators in dependence on the control signals. As regards control of the vehicle steering, a steer-by-wire system will typically comprise a steering input sensor which in use sends a signal to the ECU indicative of the rotary angle of the steering wheel hub 24 relative to the base 20. The signal to the ECU may also be indicative of the pressure applied to the steering wheel. For example, since the rotational movement of the steering wheel will be limited, a higher pressure applied to the wheel, say at the end of its movement in one direction, could be used to indicate that a greater turn is required. The ECU is operative in accordance with programmed protocols to move the steered road wheels in dependence on the input signal from the steering input sensor to steer the vehicle. Other control or feedback signals may also be provided to the ECU to enable the ECU to effect suitable control over the vehicle steering. Such other control or feedback signals might include signals representative of the vehicle speed, vehicle trajectory and signals representative of the actual steered positions of the steered road wheels, for example. The steer-by-wire system may also incorporate a steering input torque actuator which under the control of the ECU applies torque to the steering wheel 22 to simulate feedback forces from the steered road wheels. This produces resistance to the steering wheel 22 being turned so that the feel to a driver is similar to that of a conventional steering system and produces a self-centring action on the steering wheel 22. Where pressure applied to the steering wheel is used to indicate the amount of turn required, this may be linked to such haptic feedback with greater resistance being invoked at the steering wheel the higher the angle and pressure exerted.

The hand grips 26 are connected to the central hub 24 through respective elongate arms 28 and are movable between retracted and extended positions. When retracted, the majority of each grip 26 is located within the central hub 24. When extended, each grip 26 is located to one side of the hub 24 and is angled so that the grips 26 provide suitable griping surfaces which can be grasped by a driver in order to rotate the central hub 24 to steer the vehicle. When the grips 26 are extended, this will be referred to as an operative configuration of the manual steering control unit 10. When the grips 26 are retracted, this will be referred to as a storage configuration of the manual steering control unit.

The central hub 24 has an outer casing with rear 32, front 34, upper 36 and lower 38 walls which define a central cavity accessible via longitudinally elongate openings 42 on either side of the casing. The outer casing is elongate in the longitudinal direction of the vehicle having a height in the vertical direction which is less than its length. This provides a low profile. The hand grip arms 28 are each pivotally connected 44 to the casing inside the cavity at a first end and lie in a plane parallel to the upper and lower surfaces of the casing. The arms 28 can be pivoted about the connections 44 for movement in said plane between retracted positions in which they are wholly contained inside the cavity extending generally in a longitudinal direction of the vehicle and extended positions in which a second end of the arms opposite the first end projects out from the outer casing though the respective opening 42. Each grip 26 is pivotally connected 48 to its respective arm 28 at or close to the second end. The grips 26 are elongate and can each be rotated relative to its respective arm 28 between a retracted position in which a longitudinal axis of the grip lies generally parallel to the plane of the arm and an extended position in which the longitudinal axis of the grip is angled relative to the plane of the arm. When the grips 26 are in their retracted positions, the arms 28 can be pivoted between their retracted and extended positions with the grips able to pass through the respective elongate apertures 42. When the both the grips 26 and the arms 28 are retracted, they are located wholly within the outer casing of the central hub to place the manual steering control unit in its storage configuration. When the manual steering control unit 10 is to be used, the arms 28 are pivoted to their extended positions to move the grips 26 outside the casing and the grips rotated to their extended positions. The arms 28 and the grips 26 may be locked in their extended positions so that the grips 16 can be used to rotate the central hub 24 relative to the base 20 about the axis X. The manual steering control unit 10 may include actuators for automatically moving the arms 28 and the grips 26 between their extended and retracted positions under control of the ECU. However, at least the grips 26 could be configured to be moved manually between extended and retracted positions.

Each grip 26 has a trigger input controller 50, 52 which is manually operable to provide an electronic control signal to the ECU for controlling a function of the vehicle. In the present embodiment, the triggers 50, 52 are used to control acceleration and braking of the vehicle respectively via the ECU using suitable drive-by-wire technology. Each trigger 50, 52 is movable between a storage position in which it lies proximal its respective grip and a fully extended position in which it angles away from the grip. When the manual steering control unit 10 is placed in its storage configuration, the triggers 50, 52 are placed in their storage positions so that the grips can be moved inside the casing of the central hub.

The manual steering control unit 10 is mounted to an elongate arm 60 which attaches the unit 10 to a supporting structure for movement between its stowed and operative positions. In the embodiment as shown, the arm 60 comprise a pair of links 62, 64 aligned parallel to one another in a generally a horizontal plane, one in front of the other in the longitudinal direction of the vehicle. The supporting structure includes a pair of elongate tracks 66, 68 within the side wall region of the cabin. The tracks 66, 68 extend in a longitudinal direction of the vehicle and are aligned side by side in a common plane, with one track 68 laterally outside the other track 66.

A first (inner) end of each link 62, 64 is pivotally and slidably connected with a respective one of the tracks 66, 68 by means of a pivot pin 69 slidably retrained in its respective track. The forward most link 62 is pivotally and slidably connected to the laterally inner track 66 whilst the rearward most link 64 is pivotally and slidably connected to the laterally outer track rack 68.

A second (outer) end of each link 62, 64 is pivotally connected to the base of the manual steering control unit 10. The base 20 comprises a pair of mounting plates 70, 72 aligned in the same plane as the links and spaced apart. The outer ends of the links 62, 64 are received between the mounting plates and are pivotally connected to the mounting plates by respective pivot pins 74, 76. The pivotal connection between the second end of the forward most link 62 and the mounting plates is offset forwardly and laterally inwardly from the pivotal connection between the second end of the reward link 54 and the mounting plates 70, 72.

The links 62, 64, the tracks 66, 68, and the connection of the links with the mounting plates 70, 72 form a parallelogram type four bar linkage which enables the manual steering control unit 10 to maintain a constant orientation whilst moving between its stowed and operative positions. The longitudinal sliding movement of the links 62, 64 relative to the supporting structure enables the unit 10 to move between stowed and operative positions in a direction which is substantially purely lateral relative to the vehicle. This reduces the swept volume occupied by the manual steering control unit 10.

When the vehicle is operated in an autonomous mode, the manual steering control unit 10 is placed in its storage configuration and moved to the stowed position where it and the connecting arm 60 are located within the recess 18 in the side wall region 16 of the vehicle and so are outside of the free internal volume of cabin. This maximises the available space inside the cabin and allows passenger seating to be configured in non-conventional arrangements to make the best use of the available space and/or to allow for more natural interaction between multiple passengers. By providing for hand control of acceleration and braking via the manual steering control unit, the need for control pedals is eliminated so freeing up more space and allowing even greater freedom in configuring the passenger accommodation. Other controls for the vehicle can also be incorporated into the manual steering control unit, including controls for the vehicle transmission.

When the vehicle is to be used in the manual mode, the manual steering unit 10 is moved to the operative position and the hand grips 26 extended to place the manual steering unit in its operative configuration. The steering wheel 22 of the manual steering control unit 10 can then be used to steer the vehicle and other aspects of the vehicle's operation controlled by means of the triggers 52, 54 and other user input devices on the unit.

Lateral movement of the manual steering control unit 10 between stowed and operative positions, means that the unit 10 does not have to be accommodated within a dashboard in the cabin when stowed so that the dashboard need not extend as far into the cabin in a longitudinal direction and could potentially be eliminated altogether. It will be appreciated that a similar connecting bar 60 arrangement could be used to mount the manual steering unit with a supporting structure accommodated in a central console of the vehicle. However, any suitable connection arrangement can be used to enable the manual steering control unit to be moved laterally between stowed and operative positions.

The above embodiments are described by way of example only. Many variations are possible without departing from the scope of the invention as defined in the appended claims.

The invention claimed is:

1. A vehicle operable in manual and autonomous modes, the vehicle having a cabin and a manual steering control unit for use when the vehicle is operated in the manual mode, the manual steering control unit being movable between a stowed position and an operative position, wherein movement of the manual steering control unit as it transitions between the stowed position and the operable position comprises at least a component in a lateral direction of the vehicle, wherein the manual steering control unit comprises a manual steering control input device rotatably mounted to a base, the base being mounted to a supporting structure for movement between said stowed and operative positions, wherein the base is mounted to a support arm pivotally attached to the supporting structure, wherein the support arm comprises a pair of parallel links, first ends of the links being pivotally and slidably mounted to the supporting structure, second ends of the links being pivotally connected to the base.

2. A vehicle as claimed in claim 1, wherein movement of the manual steering control unit as it transitions between the stowed and operative positions is substantially exclusively in a lateral direction of the vehicle.

3. A vehicle as claimed in claim 1, wherein movement of the manual steering control unit as it transitions between the stowed and operative positions comprises components in both lateral and longitudinal directions of the vehicle.

4. A vehicle as claimed in claim 1, wherein the manual steering control unit is located laterally to one side of a free interior volume of the cabin in the stowed position.

5. A vehicle as claimed in claim 1, wherein the manual steering control unit is received within a recess in a side wall region of the cabin in the stowed position.

6. A vehicle as claimed in claim 5, wherein the recess is at least partly defined within a door of the vehicle.

7. A vehicle as claimed in claim 1, wherein the manual steering control unit is located laterally in a central region of the cabin when in the stowed position.

8. A vehicle as claimed in claim 7, wherein the manual steering control unit is located within a centre console in the cabin in the stowed position.

9. A vehicle as claimed in claim 7, wherein the manual steering control unit is selectively movable from the central stowed position to either one of a first and a second operative position, the first and second operative positions being located on opposite sides of the central stowed position.

10. A vehicle as claimed in claim 1, wherein the support arm is attached to the supporting structure for movement in a longitudinal direction of the vehicle.

11. A vehicle as claimed in claim 1, wherein the links form part of a parallelogram four bar linkage together with the supporting structure and the base.

12. A vehicle as claimed in claim 1, wherein the manual steering control unit is maintained in a constant orientation during movement between stowed and operative positions.

13. A vehicle as claimed in claim 1, wherein the manual steering control input device having a central hub and a pair of hand grips attached to the central hub by arms.

14. A vehicle as claimed in claim 13, wherein the hand grips are mounted to the central hub for movement between a storage configuration in which the hand grips are at least partially contained within the central hub and an operative configuration in which the hand grips are located outside the central hub on opposite sides.

15. A vehicle as claimed in claim 14, wherein the arms are each connected to the central hub for movement between a retracted position in which the arm is contained within the central hub and an extended position in which an end of the arm projects laterally from the central hub.

16. A vehicle as claimed in claim 15, wherein each hand grip is pivotally mounted to said end of its respective arm for movement between a retracted position in which a longitudinal axis of the hand grip is aligned co-planar with the arm and an extended position in which the longitudinal axis of the hand grip is angled relative to the plane of the arm.

17. A vehicle as claimed in claim 13, wherein the manual steering control unit comprises user operable input devices for controlling acceleration and braking of the vehicle.

18. A vehicle as claimed in claim 17, wherein the user operable input devices include a trigger input controller mounted to each hand grip.

19. A vehicle operable in manual and autonomous modes, the vehicle having a cabin and a manual steering control unit for use when the vehicle is operated in the manual mode, the manual steering control unit being movable between a stowed position and an operative position, wherein movement of the manual steering control unit as it transitions between the stowed position and the operable position comprises at least a component in a lateral direction of the vehicle, wherein the manual steering control unit comprises a manual steering control input device rotatably supported on a base, the manual steering control input device having a central hub and a pair of hand grips attached to the central hub by arms, wherein the hand grips are mounted to the central hub for movement between a storage configuration in which the hand grips are at least partially contained within the central hub and an operative configuration in which the hand grips are located outside the central hub on opposite sides, wherein the arms are each connected to the central hub for movement between a retracted position in which the arm is contained within the central hub and an extended position in which an end of the arm projects laterally from the central hub, wherein each hand grip is pivotally mounted to said end of its respective arm for movement between a retracted position in which a longitudinal axis of the hand grip is aligned co-planar with the arm and an extended position in which the longitudinal axis of the hand grip is angled relative to the plane of the arm.

20. A vehicle as claimed in claim 19 wherein the manual steering control unit comprises user operable input devices for controlling acceleration and braking of the vehicle and the user operable input devices include a trigger input controller mounted to each hand grip.

* * * * *